US009528471B2

(12) United States Patent
Clermont et al.

(10) Patent No.: US 9,528,471 B2
(45) Date of Patent: Dec. 27, 2016

(54) NOZZLE HAVING A VARIABLE NECK SECTION FOR A SPACECRAFT THRUSTER PROVIDED WITH A MOBILE NEEDLE

(71) Applicant: HERAKLES, Le Haillan (FR)

(72) Inventors: Mathieu Clermont, Saumos (FR); Sylvain Sorgeon, St Vincent de Tyrosse (FR); Jean-Michel Larrieu, Macau (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 14/773,081

(22) PCT Filed: Mar. 4, 2014

(86) PCT No.: PCT/FR2014/050479
§ 371 (c)(1),
(2) Date: Sep. 4, 2015

(87) PCT Pub. No.: WO2014/135786
PCT Pub. Date: Sep. 12, 2014

(65) Prior Publication Data
US 2016/0003195 A1 Jan. 7, 2016

(30) Foreign Application Priority Data
Mar. 7, 2013 (FR) ..................................... 13 00516

(51) Int. Cl.
*F02K 9/08* (2006.01)
*F02K 9/86* (2006.01)
(Continued)

(52) U.S. Cl.
CPC . *F02K 9/86* (2013.01); *F02K 1/08* (2013.01); *F02K 9/26* (2013.01); *F02K 9/805* (2013.01)

(58) Field of Classification Search
CPC ................. F02K 9/08; F02K 9/26; F02K 9/86
See application file for complete search history.

(56) References Cited

U.S. PATENT DOCUMENTS

| 2,583,570 A | 1/1952 | Hickman |
| 2,637,973 A * | 5/1953 | Lawrence, Jr. ........... F02K 9/48 |
| | | 114/20.2 |
| 5,491,973 A | 2/1996 | Knapp et al. |

FOREIGN PATENT DOCUMENTS

FR          2 740 105 A1    4/1997

OTHER PUBLICATIONS

International Search Report as issued in International Patent Application No. PCT/FR2014/050479, dated Jul. 10, 2014.
(Continued)

*Primary Examiner* — Gerald L Sung
*Assistant Examiner* — William Breazeal
(74) *Attorney, Agent, or Firm* — Pillsbury Winthrop Shaw Pittman LLP

(57) ABSTRACT

A nozzle of variable throat section for an aerospace vehicle thruster, the nozzle including a cylindrical housing presenting a throat of aperture diameter less than the diameter of the housing, and a needle suitable for sliding inside the housing between a high discharge rate front position in which the nose is set back from the throat of the housing, and a low discharge rate rear position in which the nose is in abutment against the throat, the needle including a rod for sliding inside the housing of the nozzle, the rod terminating in a nose of decreasing diameter. The nose of the rod is suitable for coming into abutment against the throat of the nozzle housing forming a seat and includes at least two axial grooves formed in its outer periphery to allow gas to pass when the nose is axially in abutment against the throat of the housing of the nozzle.

12 Claims, 1 Drawing Sheet

(51) Int. Cl.
*F02K 9/26* (2006.01)
*F02K 9/80* (2006.01)
*F02K 1/08* (2006.01)

(56) References Cited

OTHER PUBLICATIONS

International Preliminary Report on Patentability and the Written Opinion of the International Searching Authority as issued in International Patent Application No. PCT/FR2014/050479, dated Sep. 8, 2015.

* cited by examiner

NOZZLE HAVING A VARIABLE NECK SECTION FOR A SPACECRAFT THRUSTER PROVIDED WITH A MOBILE NEEDLE

CROSS REFERENCE TO RELATED APPLICATIONS

This application is the U.S. National Stage of PCT/FR2014/050479 filed Mar. 4, 2014, which in turn claims priority to French Application No. 1300516 filed Mar. 7, 2013. The contents of both applications are incorporated herein by reference in their entirety.

BACKGROUND OF THE INVENTION

The present invention relates to the general field of thrusters for delivering thrust for driving aerospace vehicles such as missiles, launchers, or indeed satellites, using the principle of propulsion by reaction or by ejecting gas. The invention relates more precisely to the fixed-throat nozzles fitted to solid propellant thrusters.

A solid propellant thruster is mainly constituted by a shell containing a block of powder (propellant), an ignitor, and a nozzle with a fixed diverging portion. The block of powder is pierced by a channel lying on the axis of the thruster that acts as a combustion chamber. The ignitor ignites the powder at one end of the shell and combustion of the propellant propagates from the front towards the rear of the thruster. The powder burns at a predefined rate, thereby producing combustion gas that is expelled via the nozzle.

The throat section of the nozzle makes it possible to control the combustion of the block of powder so as to maintain a desired pressure in the combustion chamber while producing the expected thrust. Thus, for a thruster delivering thrust at a single discharge rate, the throat section of the nozzle is unvarying and predetermined as a function of the desired level of thrust.

Nevertheless, having recourse to a single unvarying throat section is not suitable for a thruster that has two rates of operation (typically a high discharge rate and a low discharge rate).

In order to mitigate such a drawback, it is known to provide the nozzle with a throat section that is variable. In practice, a needle that is movable in translation is received inside the nozzle. The position of the needle in the flow of combustion gas serves to determine the flow section for the gas passing through the nozzle, thereby adjusting the gas ejection section to the operating rate of the thruster.

Nevertheless, variable throat section thrusters known in the prior art do not enable the thrust coefficients to be optimized both during a stage of operation at a high level of pressure in the thruster (corresponding to a high discharge rate) and during a stage of operation at a lower level of pressure in the thruster (corresponding to operating at a low discharge rate).

OBJECT AND SUMMARY OF THE INVENTION

A main object of the present invention is thus to mitigate such drawbacks by proposing to adapt the throat section of a thruster nozzle to a discharge rate that may vary from a high discharge rate to a low discharge rate.

This object is achieved by a nozzle of variable throat section for an aerospace vehicle thruster, the nozzle comprising a cylindrical housing presenting, at a rear end, a throat of aperture diameter less than the diameter of the housing, and a needle suitable for sliding inside the housing between a high discharge rate front position in which the nose of the needle is axially set back from the throat of the housing, and a low discharge rate rear position in which the nose of the needle is axially in abutment against the neck of the housing, the needle comprising a cylindrical rod for sliding inside the housing of the nozzle, the rod terminating at a rear end in a nose of decreasing diameter, the nose of the rod being suitable for coming axially into abutment against the seat-forming neck of the nozzle housing, in which nozzle, in accordance with the invention, the nose of the rod of the needle includes at least two axial grooves formed in its outer periphery to allow gas to pass when the nose is axially in abutment against the neck of the housing of the nozzle.

The needle of the nozzle of the invention serves to define two operating modes for the throat of the nozzle, namely a first operating mode at a high discharge rate in which the nose of the needle is set back axially away from the throat, and a second operating mode at a low discharge rate in which the nose of the needle is axially in abutment against the throat. In the first mode of operation, the flow section for the combustion gas leaving the nozzle is at a maximum. In the second mode of operation, the flow section for the combustion gas is reduced to no more than the grooves formed in the nose of the needle. This flow section is nevertheless not zero and it enables the gas ejection section to be adjusted to a low discharge rate of operation of the thruster. As a result, such a needle makes it possible to optimize the thrust coefficient to different stages of operation of the thruster corresponding to different levels of pressure therein.

Furthermore, when such a needle is in its position of axial abutment against the throat, it presents good ability to withstand the temperature of the combustion gas. The heat exchange area with the gas is relatively large, thus enhancing heat dissipation so the temperature of the needle rises to a smaller extent, which leads to very little erosion.

Finally, the needle of the nozzle of the invention makes it possible to have a nozzle that is relatively insensitive to the heating of the part constituting it, regardless of the mode of operation of the thruster. In the high discharge mode of operation, the throat of the nozzle is conventional, whereas in the low discharge mode of operation, pressing the nose of the needle against the throat leads to the gas ejection section being adjusted in a manner that is independent of the structure holding the needle and the throat.

The nose of the rod of the needle may be conical in shape. Alternatively, the nose may terminate in a portion cylindrical shape having a diameter that is less than the diameter of the rod.

Preferably, the grooves in the nose of the rod are regularly spaced apart from one another. Also preferably, the nose of the rod has three grooves that are spaced apart at 120° from one another.

The invention also provides an aerospace vehicle thruster including a nozzle of variable throat section as defined above.

BRIEF DESCRIPTION OF THE DRAWING

Other characteristics and advantages of the present invention appear from the following description made with reference to the accompanying drawing, which show an embodiment having no limiting character. In the figures.

DETAILED DESCRIPTION OF THE INVENTION

The invention relates to any aerospace vehicle thruster (for a missile, a launcher, or a satellite) operating on the principle of providing thrust by reaction or by ejecting gas.

Figure 1:
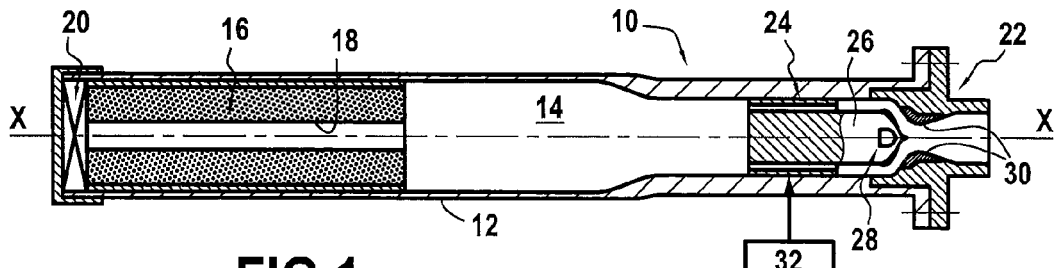
FIG. 1 is a diagrammatic longitudinal section view of a thruster fitted with a nozzle in accordance with the invention.
Figure 2:
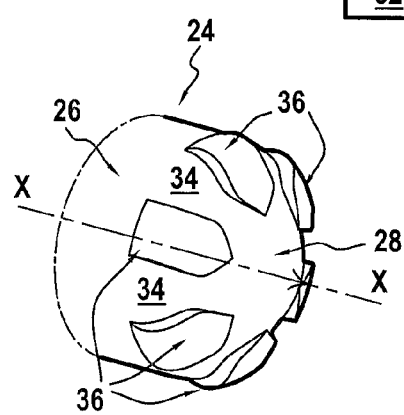
FIG. 2 is a perspective view of the needle of the FIG. 1 nozzle.

FIG. 1 is a very diagrammatic view of a non-limiting example of the invention being applied to a solid propellant thruster 10. Naturally, the invention also applies to thrusters using propellants in other forms (liquid, solid, or hybrid).

In known manner, the thruster 10 shown in FIG. 1 mainly comprises an outer shell 12 of substantially cylindrical shape containing a housing 14 also of cylindrical shape.

At a front end of the thruster, the housing 14 contains the propellant, e.g. in the form of a block of powder 16 that extends towards the front (along a longitudinal axis X-X of the thruster).

The block of powder 16 is pierced by a channel 18 situated on the longitudinal axis X-X of the thruster, this channel acting as a combustion chamber. An ignitor 20 mounted at the front end of the housing 14 enables the powder to be ignited on command.

The combustion of the propellant propagates from the front towards the rear inside the housing 14 of the thruster, and the combustion gas is discharged through a nozzle 22 having a stationary diverging cone arranged at the rear end of the thruster.

The thruster also has a needle 24 that is movable inside the housing 14. The needle comprises a cylindrical rod 26 of diameter smaller than the diameter of the housing. The needle is suitable for sliding axially inside the housing, its position in the flow of combustion gas serving to determine the flow section for the gas leaving the nozzle 22.

The rod 26 of the needle may be made out of various materials, such as in particular out of composite material, and in particular out of ceramic matrix composite material or out of refractory composite material, or out of metal, and in particular out of tungsten.

At its rear end, the rod 26 of the needle is terminated by a portion 28 having a diameter that decreases so as to form a concave streamlined profile referred to as its "nose". This nose is suitable for coming into axial abutment against a geometrical throat 30 of the housing defining the outlet opening for the combustion gas. The throat 30, which presents an aperture diameter that is less than the diameter of the housing, acts as a seat for the nose 28 of the needle.

In the embodiment of FIGS. 1, 2, 3A, and 3B, the nose 28 of the needle 24 is of conical shape.

The movement of the needle 24 inside the housing 14 along a direction parallel to the longitudinal axis X-X of the thruster is controlled by means of an actuator 32, e.g. an electromechanical, a pyrotechnic, a pneumatic, or indeed a pyrotechnic/pneumatic actuator. The movement may be reversible or it may be irreversible.

Figure 3A:
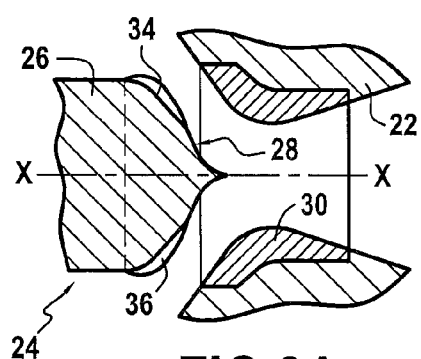
FIGS. 3A and 3B are views of the needle of FIGS. 1 and 2 in its two operating positions.
Figure 3B:
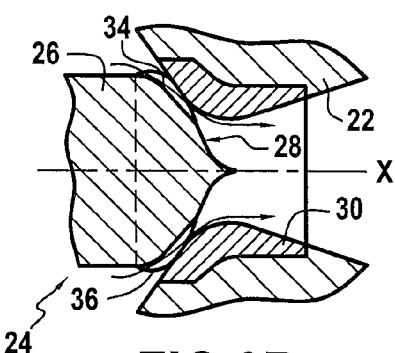
Figure 4A:
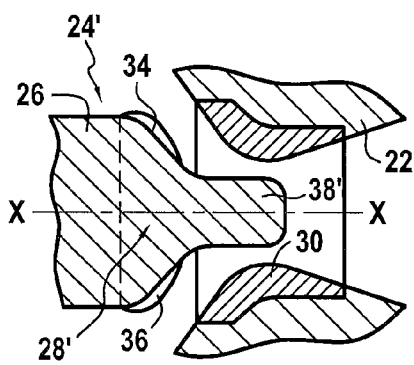
FIGS. 4A and 4B are views of a needle in a variant embodiment of the invention in its two operating positions.
Figure 4B:
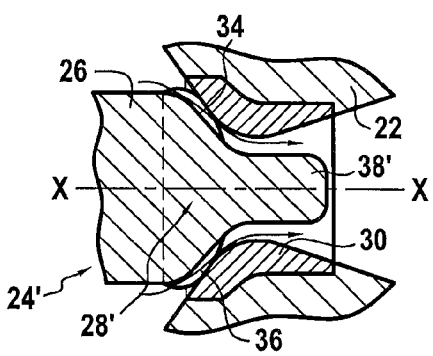

On command of the actuator 32, the needle moves in the housing of the thruster from a front position, referred to as a high discharge rate position, in which the nozzle 28 is set back axially from the throat 30 of the housing (FIGS. 1, 3A, and 4A), to a rear position, referred to as a low discharge rate position, in which the nose is axially in abutment against the throat of the housing (FIGS. 3B and 4B).

In accordance with the invention, the nose 28 of the needle includes at least two axial grooves 34 that are arranged in its outer periphery (FIG. 2) so as to allow gas to pass when the nose is in axial abutment against the throat 30 of the housing.

In the embodiments shown in FIGS. 1, 2, 3A-3B, and 4A-4B, each of the grooves 34 is defined more particularly circumferentially between two tongues 26 that project from the outside surface of the nose. Thus, when the needle is moved into its rear, low discharge rate position, the projecting tongues 26 come axially into abutment against the throat 30, thereby enabling combustion gas to be discharged by passing along the grooves 34 formed between the tongues.

The grooves 34 of the nose of the needle are preferably regularly spaced apart from one another (around the longitudinal axis X-X of the thruster). There are at least two of these grooves, and there are preferably three of them that are circumferentially spaced apart between pairs of adjacent groves by 120°.

Furthermore, the number of grooves and their flow sections are predefined so as to calibrate the discharge rate of the gas exhausted through the nozzle when the needle is in its rear low discharge rate position.

FIGS. 4A and 4B show another embodiment of the needle 24' in accordance with the invention in which the nose 28' of the needle is terminated by a portion 38' of cylindrical shape having a diameter that is less than the diameter of the throat 30. The other characteristics of the needle remain identical to those of the above-described embodiment, and in particular the presence in the nose of grooves 34 that are formed between projecting tongues 36.

The invention claimed is:

1. A nozzle of variable throat section for an aerospace vehicle thruster, the nozzle comprising:
    a cylindrical housing presenting, at a first rear end, a throat of aperture diameter less than a diameter of the cylindrical housing; and
    a needle comprising a cylindrical rod for sliding inside the cylindrical housing, the rod terminating at a second rear end in a nose of decreasing diameter, the nose being suitable for coming axially into abutment against the throat forming a seat;
    wherein the needle is suitable for sliding inside the cylindrical housing between a high discharge rate front position in which the nose is axially set back from the throat, and a low discharge rate rear position in which the nose is axially in abutment against the throat;
    wherein the nose includes at least two axial grooves formed in an outer periphery of the nose to allow gas to pass when the nose is axially in abutment against the throat.

2. The nozzle according to claim 1, wherein the nose presents a conical shape.

3. The nozzle according to claim 1, wherein the nose terminates in a portion of cylindrical shape and of diameter smaller than a diameter of the rod displaced from the nose.

4. The nozzle according claim 1, wherein the at least two axial grooves are regularly spaced apart from one another.

5. The nozzle according to claim 4, wherein the nose has three grooves spaced apart at 120° from one another.

6. An aerospace vehicle thruster including:
    a nozzle of variable throat section, the nozzle comprising:
        a cylindrical housing presenting, at a first rear end, a throat of aperture diameter less than a diameter of the cylindrical housing; and a needle comprising a cylindrical rod for sliding inside the cylindrical housing, the rod terminating at a second rear end in a nose of decreasing diameter, the nose being suitable for coming axially into abutment against the throat forming a seat;

wherein the needle is suitable for sliding inside the cylindrical housing between a high discharge rate front position in which the nose is axially set back from the throat, and a low discharge rate rear position in which the nose is axially in abutment against the throat; wherein the nose includes at least two axial grooves formed in an outer periphery of the nose to allow gas to pass when the nose is axially in abutment against the throat.

7. The nozzle according to claim 1, wherein the cylindrical rod is made out of ceramic matrix composite material.

8. The aerospace vehicle thruster according to claim 6, wherein the nose presents a conical shape.

9. The aerospace vehicle thruster according to claim 6, wherein the nose terminates in a portion of cylindrical shape and of diameter smaller than a diameter of the rod displaced from the nose.

10. The aerospace vehicle thruster according claim 6, wherein the at least two axial grooves are regularly spaced apart from one another.

11. The aerospace vehicle thruster according to claim 10, wherein the at least 2 axial grooves comprise three grooves spaced apart at 120° from one another.

12. The aerospace vehicle thruster according claim 6, wherein the cylindrical rod is made out of ceramic matrix composite material.

* * * * *

UNITED STATES PATENT AND TRADEMARK OFFICE
CERTIFICATE OF CORRECTION

| | | |
|---|---|---|
| PATENT NO. | : 9,528,471 B2 | Page 1 of 1 |
| APPLICATION NO. | : 14/773081 | |
| DATED | : December 27, 2016 | |
| INVENTOR(S) | : Mathieu Clermont et al. | |

It is certified that error appears in the above-identified patent and that said Letters Patent is hereby corrected as shown below:

On the Title Page

Item (72) Inventors:
Please correct the 2nd inventor's name as follows:
Sylvain SORGON Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*